(12) United States Patent
Niemann et al.

(10) Patent No.: US 11,685,373 B2
(45) Date of Patent: Jun. 27, 2023

(54) METHOD FOR SENSING AND PROCESSING THE CARRIAGEWAY CONDITION OF A CARRIAGEWAY ON WHICH A VEHICLE IS DRIVEN

(71) Applicant: HELLA GmbH & Co. KGaA, Lippstadt (DE)

(72) Inventors: Thomas Niemann, Delmenhorst (DE); Hauke Baumgärtel, Ganderkese (DE); Julien Bungalski, Bremen (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 24 days.

(21) Appl. No.: 17/257,522

(22) PCT Filed: Jul. 3, 2019

(86) PCT No.: PCT/EP2019/067816
§ 371 (c)(1),
(2) Date: Dec. 31, 2020

(87) PCT Pub. No.: WO2020/007897
PCT Pub. Date: Jan. 9, 2020

(65) Prior Publication Data
US 2021/0269028 A1    Sep. 2, 2021

(30) Foreign Application Priority Data

Jul. 3, 2018    (DE) ...................... 10 2018 116 079.8

(51) Int. Cl.
*B60W 30/12*    (2020.01)
(52) U.S. Cl.
CPC ......... *B60W 30/12* (2013.01); *B60W 2420/54* (2013.01); *B60W 2552/35* (2020.02); *B60W 2555/20* (2020.02)

(58) Field of Classification Search
CPC ............. B60W 30/12; B60W 2552/35; B60W 2555/20; B60W 2420/54
See application file for complete search history.

(56) References Cited

U.S. PATENT DOCUMENTS

| 2004/0138831 A1* | 7/2004 | Watanabe | ............. B60T 8/1725 702/33 |
| 2011/0200199 A1* | 8/2011 | Wakao | ................... G01H 17/00 381/56 |

(Continued)

FOREIGN PATENT DOCUMENTS

| CN | 101992778 A | * | 3/2011 | | |
| DE | 10322617 A1 | * | 12/2004 | ............. | G01S 15/87 |

(Continued)

*Primary Examiner* — Behrang Badii
*Assistant Examiner* — Jay Khandpur
(74) *Attorney, Agent, or Firm* — Muncy, Geissler, Olds & Lowe, P.C.

(57) ABSTRACT

A method for detecting and processing the carriageway condition of a carriageway on which a vehicle is driven, by means of at least one noise sensor provided on the vehicle, in particular by means of at least one mechanical vibration sensor, wherein noise signals travelling through the vehicle are sensed by a noise sensor and conclusions as to the carriageway condition are drawn from the sensed noise signals. According to said method, the section of route on which the vehicle is currently being driven is determined, the determined carriageway condition is assigned to the section of route, said section of route and the carriageway condition that has been determined and assigned to the section of route are transmitted to a computer network, in particular to a cloud-based computing service, and the information relating to the carriageway condition assigned to a section of route is made available via the computer network.

13 Claims, 2 Drawing Sheets

(56) References Cited

U.S. PATENT DOCUMENTS

Figure 1A:
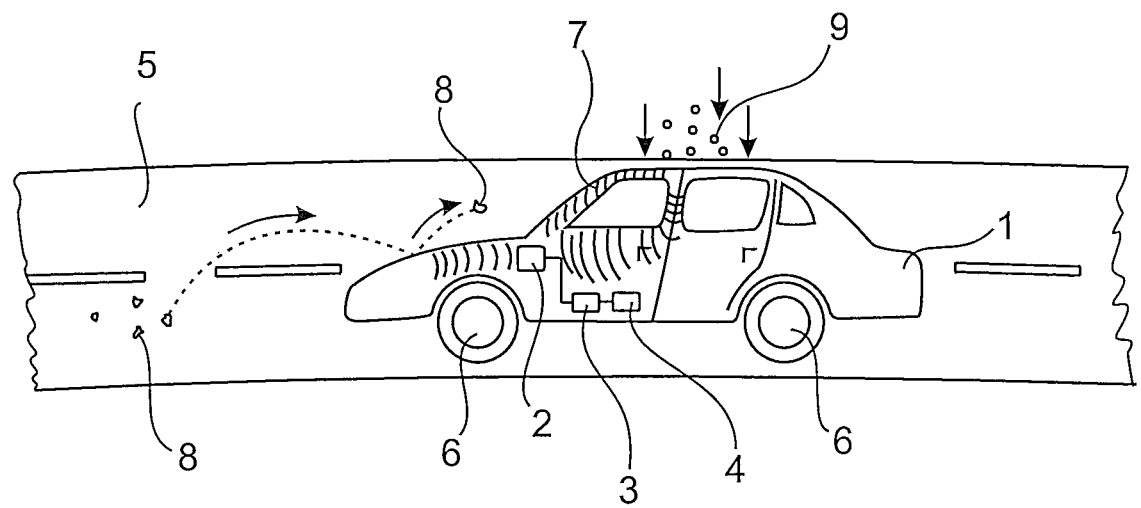

| | | |
|---|---|---|
| 2012/0033076 A1 | 2/2012 | Nakamura et al. |
| 2014/0249718 A1* | 9/2014 | Liu et al. |
| 2016/0221581 A1* | 8/2016 | Talwar .................. B60W 30/00 |
| 2019/0217864 A1* | 7/2019 | Kusukame ............ G05D 1/0088 |
| 2019/0344783 A1* | 11/2019 | Bertollini .......... B60W 60/0013 |

FOREIGN PATENT DOCUMENTS

| | | | |
|---|---|---|---|
| DE | 102014115057 A1 | 4/2016 | |
| DE | 102015203026 A1 | 8/2016 | |
| DE | 102017102745 A1 | 8/2017 | |
| WO | WO-2015074744 A1 * | 5/2015 | .............. B60T 8/172 |
| WO | WO-2017124584 A1 * | 7/2017 | .............. G01C 21/00 |

* cited by examiner

METHOD FOR SENSING AND PROCESSING THE CARRIAGEWAY CONDITION OF A CARRIAGEWAY ON WHICH A VEHICLE IS DRIVEN

The invention relates to a method for detecting and processing the carriageway condition of a carriageway on which a vehicle is driven, by means of at least one sound sensor provided on the vehicle, in particular by means of at least one structure-borne sound sensor, wherein sound signals spreading through the vehicle are detected by at least one sound sensor.

The modern motor vehicle is equipped with many sensors for sensing the state of a carriageway on which a vehicle is driven. For example, sound sensors can be used with which it is possible to detect sound signals travelling over the external shell of the vehicle, particularly structure-borne sound signals. The detection of structure-borne sound signals enables conclusions to be drawn about the condition of the carriageway, for example how wet the carriageway is, or similar.

It is to be considered a drawback of the known state of the art that the data collected can only be evaluated locally in each case, which means that each road user must be in possession of appropriate sensor systems for sensing the condition of the carriageway condition. The sensor signals captures must be evaluated individually for each road user.

The object underlying the invention is to suggest a method for sensing and processing the carriageway in which the carriageway conditions determined can also be made available to other devices and/or road users.

The invention relates to a method for detecting and processing the carriageway condition of a carriageway on which a vehicle is driven by means of at least one sound sensor provided on the vehicle, in particular by means of at least one structure-borne sound sensor, wherein sound signals spreading through the vehicle are detected by at least one sound sensor, and wherein conclusions are drawn regarding the condition of the carriageway on the basis of the sound signals detected, in which it is provided as essential to the invention that the section of route on which the vehicle is currently being driven is determined, that the determined carriageway condition is assigned to the section of route, that the section of route and the carriageway condition which has been determined and assigned to the section of route are transmitted to a computer network, in particular a cloud-based computing service, and that the information relating to the carriageway condition assigned to a section of route is made available via the computer network, that the carriageway condition determined from the currently captured sound signals is compared with the carriageway condition for the section of route on which the vehicle is currently travelling that is stored in the computer network, and that if there is a discrepancy between the currently determined and the stored carriageway conditions, it is concluded that the vehicle has as least partially left the carriageway.

Sound sensors, in particular structure-borne sound sensors, may be arranged on a vehicle so as to be connected with the outer shell of the vehicle in a way that enables transmission of mechanical vibration. For example, the structure-borne sound sensors may be arranged in the wheel arches and may have the form of piezoelectric elements, for example. Structure-borne sound signals which are generated on the external shell of the vehicles by particles stirred up from the carriageway and hitting the vehicle, for example dirt particles or also liquid particles in the case of a wet carriageway, may be detected by structure-borne sound sensors arranged in the wheel arches. For example, the particles may be hurled against the inner cladding of the wheel housing liner by the tyre while the vehicle is being driven, and generate a characteristic signal pattern upon contact, which pattern may be detected by the sound sensors. Different captured structure-borne sound signals may be assigned to different carriageway conditions on the basis of the characteristic signal patterns, of a carriageway wet with liquid for example, or a dirty carriageway. The vibrations that arise when the vehicle travels over a carriageway may also be detected by the structure-borne sound sensors. In this case too, different structure-borne sound signals are generated by different carriageway surfaces, for example a cobbled street, a dirt road or a motorway, and may be assigned to the different carriageway conditions, in this case to different carriageway surfaces. The information about the current carriageway condition of the section of road on which the vehicle is being driven may be transmitted to a computer network, in particular a cloud-based computing service, via a data communication link. For this purpose, the vehicle may be equipped with a connecting device for establishing a connection to the internet, for example, or a similar data communication link. The currently determined carriageway conditions are assigned to the section of route on which the vehicle is currently travelling. The carriageway conditions determined in each case for various route sections may be stored in a computer network, for example a cloud computing service, for example a cloud server. It is then possible for example to assign information about the current degree of coverage with a liquid, that is to say the level of water on the carriageway, the current state of the carriageway, the presence of potholes, particularly heavily soiled parts of the carriageway or the like to a section of the route. The data about the sections of the route over which the vehicle has been driven may then be made available to other road users who are connected to the computer network, via a cloud server, for example. Consequently, vehicles which are not equipped with an suitable sensor system can also benefit from the detected carriageway conditions. Moreover, in vehicles which are also equipped with a corresponding sensor system, the data retrieved from the server can be used to verify their vehicles' own sensor data.

The carriageway condition of the route currently being travelled may be detected by means of sound sensors, in particular by means of structure-borne sound sensors. The currently captured and determined carriageway condition is compared with the carriageway condition for the route currently being travelled which is stored in the computer network. In the event of a difference, particularly a significant difference, between the currently determined carriageway condition and the carriageway condition stored in the computer network, it may be concluded that the vehicle has at least partially left the carriageway, that is to say the vehicle has departed from the traffic lane. In the event that the vehicle leaves the carriageway, for example, i.e. it is travelling on the hard shoulder, for example, a sound signal may be detected which is very different from the sound signal that would be created by the carriageway surface on which the vehicle was being driven. Upon detection of such a difference, a warning signal may be output to the vehicle driver, for example. For example, a hard shoulder of a carriageway may be gravelled, so that when the vehicle is driven on the hard shoulder a different structure-borne sound signal spreads through the vehicle then when it is driven on the carriageway.

In a further development of the method, in the event of a difference between the currently determined carriageway condition and the stored carriageway condition, a lane keeping assistance system installed in the vehicle is started. When a difference is detected between the carriageway surface on which the vehicle is currently travelling and the carriageway surface stored in the computer system, a lane keeping assistance system may be started. A difference may be detected because the sound sensor technology senses a carriageway condition that differs from the carriageway condition stored in the computer network. The vehicle's travel path may then be corrected by the lane keeping assistance system. Further sensing means, for example an optical detection of the carriageway, may further be implemented in the lane keeping assistance system installed in the vehicle in order to verify the plausibility of the results of the structure-borne sound sensor system.

In a further development of the method, the detected sound signal is evaluated for the existence of signal patterns that are caused by driving over a limit marking on the side of the carriageway, and if such a characteristic signal pattern is found, a warning signal is emitted to the vehicle driver and/or a lane keeping assistance system installed in the vehicle is started. Carriageways may have carriageway limit markings which generate a characteristic vibration pattern, that is to say a characteristic signal pattern to be sensed by the structure-borne sound sensors on the outer shell of the vehicle when it travels over them. In particular, the carriageway limit markings may be in the form of "rumble strips" which produce a characteristic acoustic signal perceived as a rumbling sound when they are driven over by a vehicle tyre. The structure-borne sound signals sensed by the sound sensor technology, particularly by means of the structure-borne sound sensor system, may be examined for the existence of a characteristic signal pattern of such kind. If such a characteristic signal pattern is detected, a warning signal may be emitted to the vehicle driver, indicating that departure from the intended carriageway by the vehicle is possible. Further, a lane keeping system installed in the vehicle may be started so that an automatic correction can be made to the travel path.

In a further development of the method, a conclusion is drawn about the temporal development of the state of the carriageway on the basis of the comparison between the currently determined carriageway condition and the carriageway condition saved in a computer network. The current carriageway condition determined from the structure-borne sound signals may be compared with the carriageway condition for the section of route the vehicle is currently driving over which is saved in a computer network. From this comparison, a temporal trend of the state of the carriageway condition may be determined. For example, the road surface may have changed, potholes may have appeared, for example, or a large amount of dirt may have been deposited on the carriageway in the meantime. The temporal development of the state of the carriageway may be evaluated by the computer network, for example, and forwarded to service facility, for example a roads maintenance department.

In a further development of the method, the information about the temporal development of the state of the carriageway may be made available to at least one service facility, in particular a roads maintenance department. In order to support the prompt elimination of defects, such as the appearance of potholes, heavy soiling or the like, the information about the current state of the carriageway, that is to say the current carriageway condition, can be made available to service facilities such as a roads maintenance department for example. The carriageway conditions sensed currently by means of the structure-borne sound sensor system installed on the vehicle may be stored in a cloud service for example, to which a roads maintenance department for example has access. The assigned and stored carriageway conditions may be kept up-to-date by a large quantity of vehicles travelling over the corresponding route sections. In this way, in the event of snowfall, for example, the progress of snow clearing operations can also be monitored in real time.

In a further development of the method, at least one sound sensor is a structure-borne sound sensor, and a structure-borne sound signal generated by the vehicle travelling on the carriageway and spreading through the vehicle is captured by the structure-borne sound sensor. With the sound sensors arranged inside a vehicle, in particular the structure-borne sound sensors, vibrations or oscillations created when the vehicle travels over a carriageway may be sensed. For example, different structure-borne sound signals may be generated on the external shell of the vehicle by different carriageway surfaces. For example, a smooth, even carriageway surface may produce a different structure-borne sound signal on a vehicle than a soiled carriageway surface when the vehicle travels over it. Different characteristic structure-borne sound signal patterns are assigned to different carriageway surfaces and different carriageway states. In this way, conclusions may be drawn about the current state of the carriageway and the carriageway condition on the basis of the sensed structure-borne sound signal which spreads over the external shell of the vehicle. The carriageway condition assigned to a section of route may be made available to a cloud server, so that other road users can also access the carriageway condition which is assigned to a section of the carriageway.

In a further development of the invention, the route segment travelled by a vehicle is captured by means of a positioning system, in particular by means of a GPS system, the route segment the vehicle is currently travelling on is checked for agreement with a travel segment stored in the computer network, and that in the event of agreement the currently detected carriageway condition is compared with the carriageway condition stored for the section of route. The current position of the vehicle, that is to say the current route section, may be captured by a positioning system of the vehicle, for example a GPS system. Connecting to a computer network, in particular a cloud server makes it possible to check whether information about carriageway condition has been stored for the section of route on which the vehicle is currently travelling. The information about carriageway condition captured on the vehicle may be compared with the carriageway condition information stored on the server. This in turn enables a plausibility check to be carried out of the results captured.

In a further development of the method, the sound signal captured is evaluated for the existence of signal patterns characteristic of various carriageway conditions, in particular for the condition of the carriageway surface, and the information about the carriageway surface assigned to a section of route is transmitted to a computer network. Sound signals which spread through the vehicle, particularly the outer shell of the vehicle, may be sensed by the sound sensor technology, in particular the structure-borne sound sensor system. For example, various carriageway surfaces, e.g., gravelled roads, concrete carriageways or smooth, asphalted roadways, may produce different structure-borne sound signals in the vehicle when a vehicle travels over them. In this context, different carriageway surfaces may have different characteristic signal patterns, which may be used to sense the carriageway surface with the aid of the structure-borne sound signal measurements. Moreover, the state of the carriageway, for example soiling of the carriageway, the existence of bumps or potholes, may also be detected via the corresponding signal patterns of the structure-borne sound signals which spread through the vehicle. The state information assigned to the various route sections may be transmitted to a computer network. Here, a virtual map may be created of the road surface and/or the road condition, for example. The current state of carriageway soiling my be transferred to a virtual map, for example.

In a further development of the method, the sound signal captured is evaluated for signal patterns characteristic of the impact of hailstones and/or particles stirred up from the carriageway, in particular loose chippings striking the external shell of the vehicle, the occurrence of hail or loose chippings is assigned to the section of route on which the vehicle is travelling, and information about the occurrence of hail or loose chippings on the section of route captured is transmitted to the computer network in real time. Impact events, for example contact events caused by hail or other impacting objects, such as loose chippings, may be sensed by the sound sensors, particularly by the structure-borne sound sensors which are mounted on the vehicle. When particles such as hailstones strike the vehicle, pulse-like structure-borne sound signals which may differ from other vibration signal patterns. In particular, when hailstones or for example loose chipping particles strike a vehicle, pulse series are produced which can be distinguished effectively from the practically unchanging signal components of normal driving vibration due to their accumulation of transient signal components. Thus, with the corresponding evaluation of the captured structure-borne sound signals it is possible to sense the occurrence of areas on a carriageway that are covered with loose chippings or the occurrence of a hailstorm. Sites with loose chippings or the presence of hail on the section of route the vehicle is currently travelling on may be forwarded to the computer network and so made available to other road users or service facilities. For example, the information may be made available to insurance companies so that said information may be included for the purposes of claims assessment. Moreover, other road users who are travelling on the section of route in question may be warned of loose chippings for example before they encounter them, since loose chippings in particular can prolong the braking distance. Particularly in the case of autonomously driven vehicles, this information may be used for the correct calculation of a braking distance. This also applies for the occurrence of hailstorms, since in these circumstances a mixed layer of water and ice can form on the carriageway very quickly, and represents a substantial safety hazard, particularly as the vehicle passes from a dry carriageway with good static friction to a slippery carriageway covered with hail. A similar method with adapted characteristic signal patterns may also be used to provide warning of sandstorms, for example.

In a further development of the method, the sound signal captured is evaluated for existence of signal patterns characteristic of the impact of stirred up liquid against the outer shell of the vehicle, conclusions are drawn on the basis of the captured signal patterns about the state of coverage with water of the section of route on which the vehicle is travelling, and the state of water coverage of the section of route on which the vehicle is travelling is transmitted in real time to a computer network. With the sound sensors arranged on a vehicle, particular the structure-borne sound sensors arranged in the wheel arches, moisture stirred up from the carriageway by the tyres may be detected. The moisture stirred up from the carriageway by the tyres may strike the inner cladding of the wheel housing liners and thus cause oscillations, i.e. structure-borne sound signals on them. The propagating structure-borne sound signals may be sensed by means of the structure-borne sound sensors and evaluated for the existence of signal patterns characteristic of impacting moisture. Moisture on a carriageway which is detected in this way may be assigned to the section of route on which the vehicle is currently travelling and sent to a central computer network, in particular a cloud-based service. The information about the degree of water coverage on a carriageway may thus be made available to other road users in real time.

In a further development of the method, the carriageway conditions stored in the computer network are included in the predictive calculation of a travel route for the vehicle. For example, a navigation system may be installed on the vehicle, by which a travel route to an intended destination can be calculated in advance. Route types, such as the fastest route, the shortest route or even a scenic countryside route may be selected in a navigation system. For example, a comfortable route may selected which passes only over route sections with a particularly good, for example particularly smooth carriageway substrate using the carriageway conditions for various segments of the route stored in a computer network, in particular a cloud server. This approach may also be used to avoid particularly heavily soiled carriageways or the like.

In a further development of the invention, the currently determined carriageway condition and a carriageway condition stored in the computer network for the route segment on which the vehicle is currently travelling is included in the control system for the vehicle's dynamic handling systems. In particular, especially in automated and autonomous driving mode of a correspondingly designed vehicle, dynamic handling systems can be controlled preventively based on the carriageway conditions stored in the computer network to ensure low-risk operation at all times. For example, in this context a slip control and/or power control of the vehicle may be adjusted for handling dynamics optimised for the stored data. Thus for example the condition of the carriageway, for example the presence of loose chippings or hail on the carriageway, may be incorporated in the calculation of the braking distance.

Figure 1B:
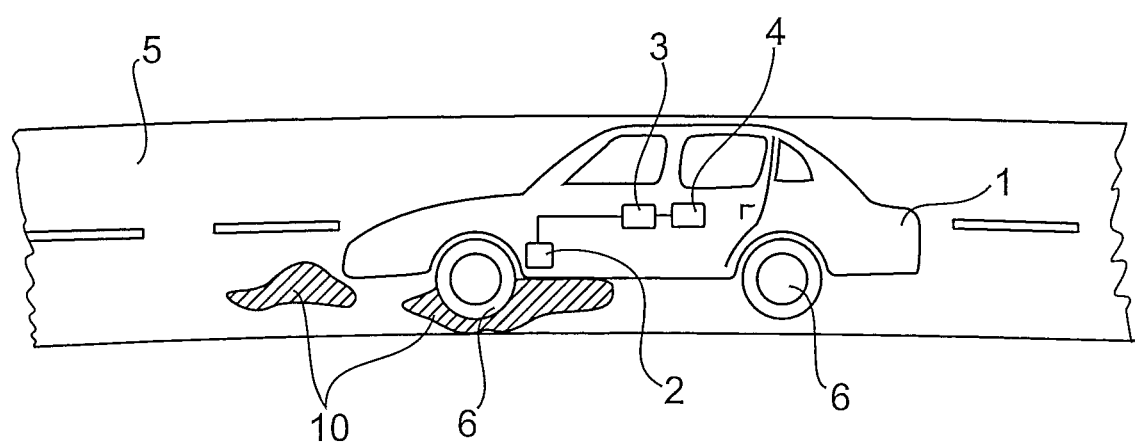
Figure 1C:
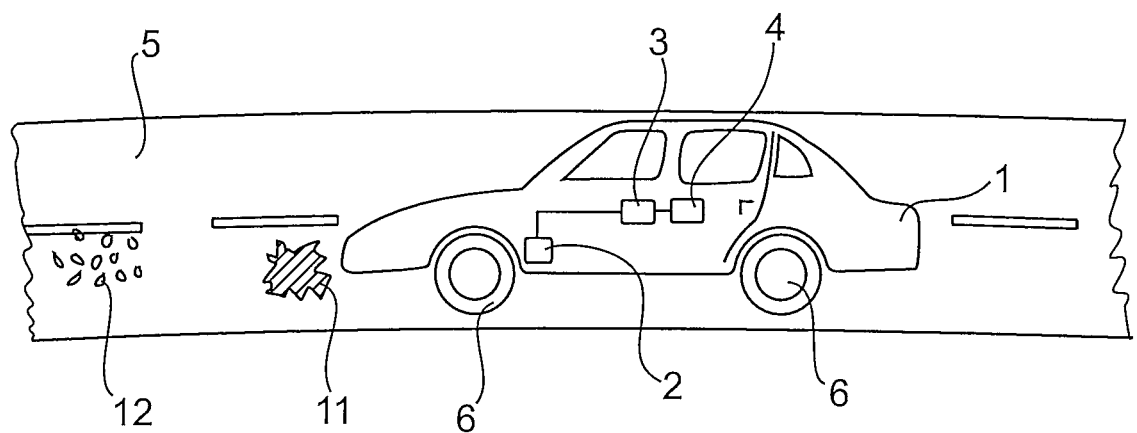

In the following text, the invention will be explained further with reference to an exemplary embodiment represented in the drawing. Individually, the schematic representations show in:

FIG. 1a a motor vehicle with a sensor apparatus on a carriageway covered with loose chippings;

FIG. 1b a motor vehicle with a sensor apparatus on a carriageway covered with liquid;

FIG. 1c a motor vehicle with a sensor apparatus on a soiled carriageway; and

Figure 2:
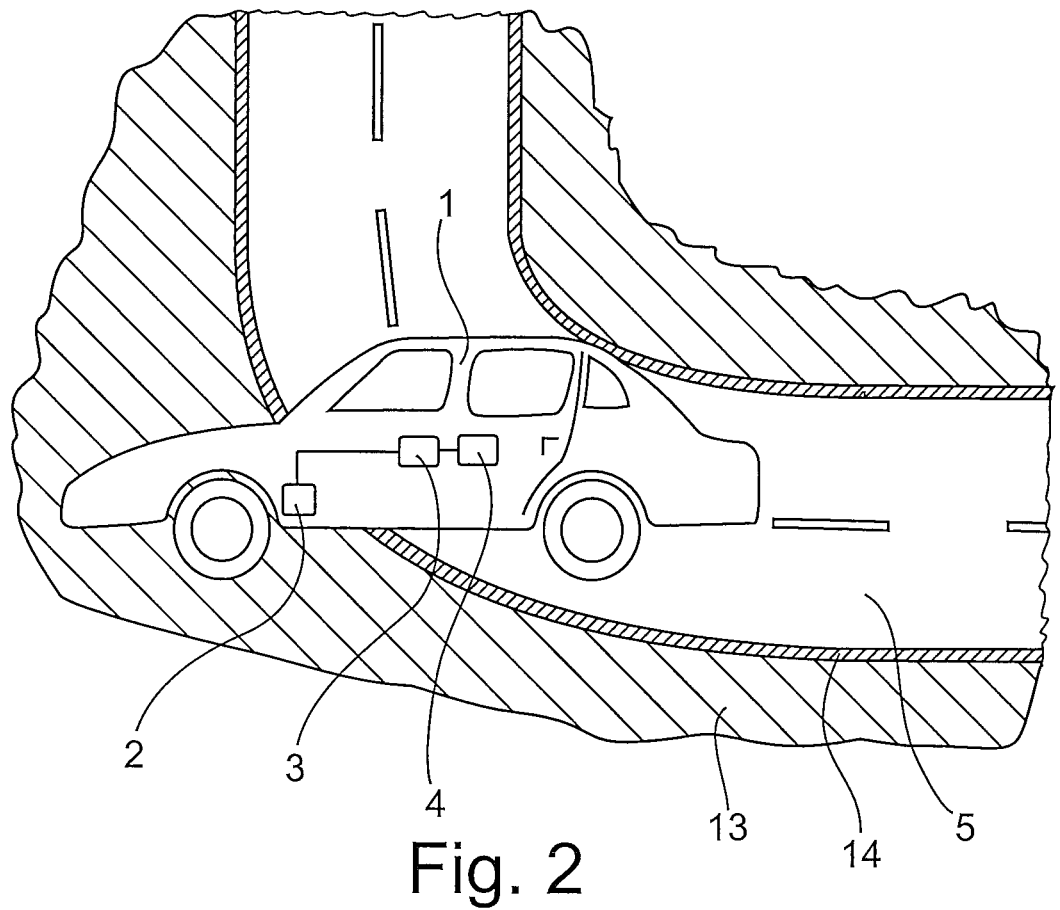

FIG. 2 a vehicle with a sensor apparatus which is departing from a carriageway.

FIG. 1a represents a vehicle 1 with a sensor apparatus 2. The sensor apparatus 2 is a structure-borne sound sensor for sensing structure-borne sound signals spreading over the external shell of the vehicle. A processing device 3 and a transmitting and receiving device 4 are assigned to the sensor apparatus 2. In this example, the carriageway 5 on which the vehicle 1 is travelling is covered with loose chippings 8. Loose chippings 8 may be stirred up for example by the vehicle tyres 6 or also by vehicles in front of the vehicle, or by the wind, and impact the external shell of the vehicle. When they strike the external shell of the vehicle, a structure-borne sound signal 7 is produced and spreads over the external shell of the vehicle. The structure-borne sound signal 7 spreading over the external shell may be sensed by means of the sensor apparatus 2 and processed by means of the processing device 3. The sensor apparatus 2 may be for example piezoelectric elements, for example piezoelectric foils. The structure-borne sound signals 7 captured may be evaluated for signal patterns which are characteristic of the impact of loose chipping particles 8. For example, the amplitude of the signal, the frequencies generated and the pulse sound content of the signal may be evaluated in this context. Equally, the structure-borne sound signals 7 captured may be evaluated for the existence of signal patterns that are characteristic of the impact of hailstones 9. Areas of loose chippings or hailstorms that are detected may be transmitted by the transmitting and receiving device 4 to a computer network, particularly in real time to a computer network, such as a cloud service for example. For this purpose, the transmitting and receiving device 4 may establish an internet connection to the cloud service for example. Due to the real time transmission of the information about the current carriageway condition, i.e. whether the carriageway 5 on which the vehicle is now travelling is covered with loose chippings 8 or whether hailstones 9 are on the carriageway 5, the information from the evaluated sensor data from the vehicle 1 can also be transmitted to other road users. Thus for example areas which are covered with loose chippings 8 can be avoided, to prevent the vehicle's paintwork from being damaged for example.

FIG. 1b is a diagrammatic representation of a vehicle 1 according to FIG. 1a. Identical components are denoted with the same reference signs. The vehicle 1 travels on a carriageway 5 which is covered with a liquid 10, e.g., rain. A sensor apparatus 2 may be arranged in the region of the wheel housing liners, in particular behind the vehicle tyres 6 in the direction of travel in order to sense liquid on a carriageway. Liquid 10 on the carriageway 5 may be thrown up by the vehicle tyres 6. The impact of the liquid 10 may cause the production of structure-borne sound signals 7 in the wheel housing liners, which signals may be captured by the sensor apparatuses 2. The captured structure-borne sound signals may be evaluated for signal patterns characteristic of the impact of stirred up liquid 10 by the processing device 3. Information about sections of route 5 covered with liquid 10 may be transmitted in real time to a computer network, in particular a cloud service by the transmitting and receiving device 4. The information about the carriageways 5 covered with liquid 10 may thus be made available to other road users as well.

FIG. 1c represents a vehicle 1 according to FIGS. 1a and 1b. Identical components are denoted with the same reference signs. The carriageway 5 on which the vehicle 1 is travelling has potholes and/or soiled areas 12, for example. When travelling on a carriageway, structure-borne sound signals 7 may be produced by potholes 11 or dirty carriageways 12, and then spread over the external shell of the vehicle 1. These structure-borne sound signals 7 may be sensed by means of the sensor apparatuses 2 and evaluated by means of the processing device 3. In particular in this context, the captured structure-borne sound signals 7 may be evaluated for the existence of signal patterns that are characteristic of the presence of soiling 12 or a pothole 11 on the carriageway. Potholes 11 or soiling 12 detected on the carriageway 5 may be transmitted to a computer network, in particular a cloud service by the transmitting and receiving device 4 and so made available to other road users as well.

FIG. 2 represents a vehicle 1 according to any of FIGS. 1a to 1c. Identical components are denoted with the same reference signs. Vehicle 1 travels on a carriageway 5 with a hard shoulder 13. The carriageway 5 is marked on the side by carriageway limit markings 14. Information about the carriageway condition of the carriageway 5 over which the vehicle 1 has travelled may be stored in a computer network, for example a cloud service. The carriageway condition currently captured by the sensor apparatus 2 may be compared in real time with the carriageway condition stored on the cloud service. A substantial difference between the currently determined carriageway condition and the stored carriageway condition may be interpreted to indicate that the vehicle 1 is departing from the carriageway 5. In the event that a substantial difference occurs, a warning signal may be emitted for the vehicle driver for example, and/or an automatic lane keeping assistance system may be activated. In addition, the sensor apparatus 2 may also sense a structure-borne sound signal 7 which is produced when the vehicle travels over the carriageway limit marking 14, which may have the form of "rumble strips", for example. When a signal pattern characteristic of the vehicle being driven over the carriageway limit marking 14 is detected, a warning signal may be emitted to the vehicle driver, and/or an automatic lane keeping assistance system may be activated.

All features described in the preceding description and in the claims can be combined in any permutation with the features of the independent claim. The disclosure of the invention is thus not limited to the feature combinations described and/or claimed, but rather all feature combinations that are practicable within the scope of the invention are to be considered disclosed.

LIST OF REFERENCE FIGURES

1 Vehicle
2 Sensor apparatus
3 Processing device
4 Transmitting and receiving device
5 Carriageway
6 Vehicle tyre
7 Structure-borne sound signal
8 Loose chippings
9 Hailstones
10 Liquid
11 Pothole
12 Dirt
13 Hard shoulder
14 Carriageway limit markings

The invention claimed is:

1. A method for detecting and processing a carriageway surface condition of a carriageway on which a vehicle is driven, by means of at least one structure-borne sound sensor, the method comprising:
   detecting sound signals spreading through the vehicle by means of the at least one structure-borne sound sensor;
   drawing conclusions about the carriageway surface condition on a basis of the detected sound signals;
   determining a section of a route on which the vehicle is currently travelling;
   assigning the detected carriageway condition to the section of the route;
   transmitting the section of the route and the detected carriageway surface condition assigned to the section of the route are transmitted to a computer network;

making the information about the detected carriageway surface condition assigned to the section of the route available via the computer network;

comparing the detected carriageway surface condition based on the detected sound signals with a carriageway surface condition based on the stored sound signals stored in the computer network for the section of the route on which the vehicle is currently travelling; and in the event of a difference between the detected sound signal for the carriageway and the stored sound signal for the carriageway, concluding that the vehicle is at least partially departing from the carriageway.

2. The method according to claim 1, further comprising, in the event of a difference between the detected carriageway surface condition and the stored carriageway surface condition, starting a lane keeping assistance system installed in the vehicle.

3. The method according to claim 1, further comprising evaluating the detected sound signals for existence of a signal pattern caused by driving over a carriageway limitation marking on a side of the carriageway; and if the signal pattern is detected, emitting a warning signal to the vehicle driver and/or starting a lane keeping assistance system installed in the vehicle.

4. The method according to claim 1, further comprising drawing a conclusion drawn regarding a temporal development of a state of the carriageway from the comparison of the detected carriageway surface condition with the carriageway surface condition stored in the computer network.

5. The method according to claim 4, further comprising making available the conclusion regarding the temporal development of the state of the carriageway to at least one service facility.

6. The method according to claim 1, wherein a structure-borne sound signal produced when the vehicle travels on the carriageway and spreading through the vehicle is sensed by the structure-borne sound sensor.

7. The method according to claim 1, further comprising:
capturing, by means of a positioning system, the route segment travelled by the vehicle;
checking the route segment the vehicle is currently travelling for agreement with a route segment stored in the computer network; and
in the event of agreement, comparing the detected carriageway surface condition with the carriageway surface condition stored for the section of route.

8. The method according to claim 1, further comprising:
evaluating the sound signals for existence of signal patterns characteristic of various carriageway conditions; and
transmitting information about the carriageway surface assigned to the section of route to the computer network.

9. The method according to claim 1, further comprising:
evaluating the sound signals for existence of signal patterns characteristic of impact of hailstones and/or particles thrown up from the carriageway against the outer shell of the vehicle;
assigning the occurrence of hailstones and/or particles the section of route travelled by the vehicle; and
transmitting information about the occurrence of hailstones and/or particles on the section of route in real time to the computer network.

10. The method according to claim 1, further comprising evaluating the sound signals for existence of signal patterns characteristic of an impact of thrown up liquid against an outer shell of the vehicle;
drawing conclusions from the signal patterns regarding a state of water coverage on the section of route on which the vehicle is travelling; and
transmitting the state of water coverage on the section of route on which the vehicle is travelling to the computer network in real time.

11. The method according to claim 1, further comprising incorporating the carriageway conditions stored in the computer network in a predictive calculation of a travel route of the vehicle.

12. The method according to claim 1, further comprising incorporating the detected carriageway surface condition and the carriageway surface condition stored in the computer network for the travel route on which the vehicle is travelling in a dynamic handling control system of the vehicle.

13. A method for detecting and processing a carriageway surface condition of a carriageway on which a vehicle is driven, by means of at least one structure-borne sound sensor, the method comprising:
detecting sound signals spreading through the vehicle by means of the at least one structure-borne sound sensor;
drawing conclusions about the carriageway surface condition on a basis of the detected sound signals;
determining a section of a route on which the vehicle is currently travelling;
assigning the detected carriageway condition to the section of the route;
transmitting the section of the route and the detected carriageway surface condition assigned to the section of the route are transmitted to a computer network;
making the information about the detected carriageway surface condition assigned to the section of the route available via the computer network;
comparing the detected carriageway surface condition based on the detected sound signals with a carriageway surface condition based of the stored sound signals stored in the computer network for the section of the route on which the vehicle is currently travelling; and
in the event of a difference between the detected sound signal for the carriageway and the stored sound signal for the carriageway, concluding that the vehicle is at least partially departing from the carriageway, if concluding that the vehicle is at least partially departing from the carriageway a warning signal is emitted to the driver.

* * * * *